United States Patent [19]
Jang et al.

[11] Patent Number: 5,948,870
[45] Date of Patent: Sep. 7, 1999

[54] POLYMERIZATION METHOD FOR CARBOXYLATED STYRENE-BUTADIENE LATEX USING TERTIARY-DODECYL MERCAPTAN AS CHAIN TRANSFER AGENT

[75] Inventors: Killsoo Jang; Jeong Geun Kim; Hyoung Seok Han; Kun Ho Yang, all of Ulsun, Rep. of Korea

[73] Assignee: Korea Kumho Petrochemical Co., Ltd., Seoul, Rep. of Korea

[21] Appl. No.: 08/978,053

[22] Filed: Nov. 25, 1997

[30] Foreign Application Priority Data

May 19, 1997 [KR] Rep. of Korea ................. 97-19277

[51] Int. Cl.$^6$ ................. C08F 2/38; C08F 2/24
[52] U.S. Cl. ................. 526/73; 526/224
[58] Field of Search ................. 526/73, 224; 524/822

[56] References Cited

U.S. PATENT DOCUMENTS

| | | | |
|---|---|---|---|
| 4,501,845 | 2/1985 | Baus et al. | 524/460 |
| 4,506,057 | 3/1985 | Greene et al. | 524/461 |
| 4,537,916 | 8/1985 | Bruschtein et al. | 524/458 |
| 4,544,697 | 10/1985 | Pickelman et al. | 524/458 |
| 5,763,521 | 6/1998 | Claassen | 524/458 |

OTHER PUBLICATIONS

Joyce et al., *Free Radical–Initiated Reaction of Ethylene with Carbon Tetrachloride*, pp. 2529–2532, 1948.
Blackley, *Emulsion Polymerization: Theory and Practice*, Applied Science Publishers, Ltd., London, 1982.

*Primary Examiner*—Christopher Henderson
*Attorney, Agent, or Firm*—Kenyon & Kenyon

[57] ABSTRACT

The object of the present invention is to provide an polymerization method for carboxylated styrene-butadiene latex using paper coating with the gel content having 50%~90% by controlling the reaction with the sole use of tertiary-dodecyl mercaptan in the high temperature polymerization method with following steps comprising;

i) reacting and batch charged polymerizing 10~20 wt % of total styrene and butadiene monomers with small quantity of acid monomers, emulsifier, initiator and reducing agent at about 60° C. in initial polymerization step; and ii) reacting and continuously charged polymerizing 80~90 wt % of total styrene and butadiene monomers with small quantity of acid monomers, emulsifier and tertiary dodecyl mercaptan as chain transfer agent with increasing the polymerization temperature step by step from 70° C., 75° C. to 80° C. in increment polymerization step.

4 Claims, 1 Drawing Sheet

POLYMERIZATION METHOD FOR CARBOXYLATED STYRENE-BUTADIENE LATEX USING TERTIARY-DODECYL MERCAPTAN AS CHAIN TRANSFER AGENT

BACKGROUND OF THE INVENTION

1. Field of the Invention

The present invention relates to an emulsion polymerization method for preparing carboxylated styrene-butadiene latex which can be used for paper coating, using tertiary-dodecyl mercaptan as chain transfer agent to control the reaction for desired gel content.

2. Description of Prior Art

The emulsion polymerization method for latex can be classfied into three ways; one is to classify low temperature polymerization method and high temperature polymerization method according to the temperature; another is to classify batch charge method and continuous charge method according to the charge method; the third is seeded polymerization method and continuous polymerization method according to whether it uses seed latex or not. However, whichever method may be selected, the batch charge has to be used at the initial polymerization step. In other words, batch charge has to be included at the initial polymerization step even at the continuous charge method.

In the case of emulsion polymerization method for preparing styrene-butadiene latex using tertiary dodecyl mercaptan as chain transfer agent, there is one critical problem for controlling the gel content. It comes from the fact that the decomposition or the reaction rate of tertiary-dodecyl mercaptan is much faster than the conversion rates of the monomers including butadiene. After the total exhaustion of tertiary-dodecyl mercaptan, therefore, unreacted double bonds of butadiene allow the sites for cross-linking to result in rapid increase of the gel content.

Generally, in the system which includes butadiene monomer more than 20 wt %, the latex having lower gel content than 40 wt % can be prepared either by the low temperature polymerization method, or by suspending the polymerization at the desired polymerization degree. On the contrary, the latex having higher gel content than 50 wt % can be obtained through the high tempertature polymerization method, but the reaction should be controlled for desired gel content after exhaustion of tertiary-dodecyl mercaptan. Recently, methylstyrene dimer as chain trasfer agent, solely or mixed with tertiary-dodecyl mercaptan, has been used for obtaining such latex.

To solve above mentioned problems, the inventors have researched and accomplished a novel polymerization method for controlling the desired gel content (50~90%) by continuously charging tertiary-dodecyl mercaptan in increment polymerization step without rapid increase of gel content and molecular weight.

SUMMARY OF THE INVENTION

The object of the present invention is to provide an efficient polymerization method for carboxylated styrene-butadiene latex which can be used for paper coating. The latex having higher gel content than 50% can be obtained by controlling the reaction using tertiary-dodecyl mercaptan solely in high temerature polymerization method with following steps comprising;

i) reacting and batch charged polymerizing 10~20 wt % of total styrene and butadiene monomers with small quantity of acid monomers, emulsifier, initiator and reducing agent at about 60° C. in initial polymerization step; and ii) reacting and continuously charged polymerizing 80~90 wt % of total styrene and butadiene monomers with small quantity of acid monomers, emulsifier and tertiary dodecyl mercaptan as chain transfer agent with increasing the polymerization temperature step by step from 70° C., 75° C. to 80° C. in increment polymerization step.

In initial polymerization step, the gel content of latex can be confined by reducing the amount of monomers, especially, butadiene monomers. If the gel content of initial polymer is less than 20% of the desired value for the final latex, the gel content of the final latex can be controlled kinetically in increment polymerization step by continuous charge of monomers and tertiary-dodecyl mercaptan.

The other object of the present invention is to provide the kinetic control method of the gel content of latex by reducing the charge of butadiene monomer in the initial polymerization step without chain trasfer agent and by polymerizing most of the monomers in increment polymerization step of continuous monomer charge with tertiary-dodecyl mercaptan.

DETAILED DESCRIPTION OF THE INVENTION

Figure 1:
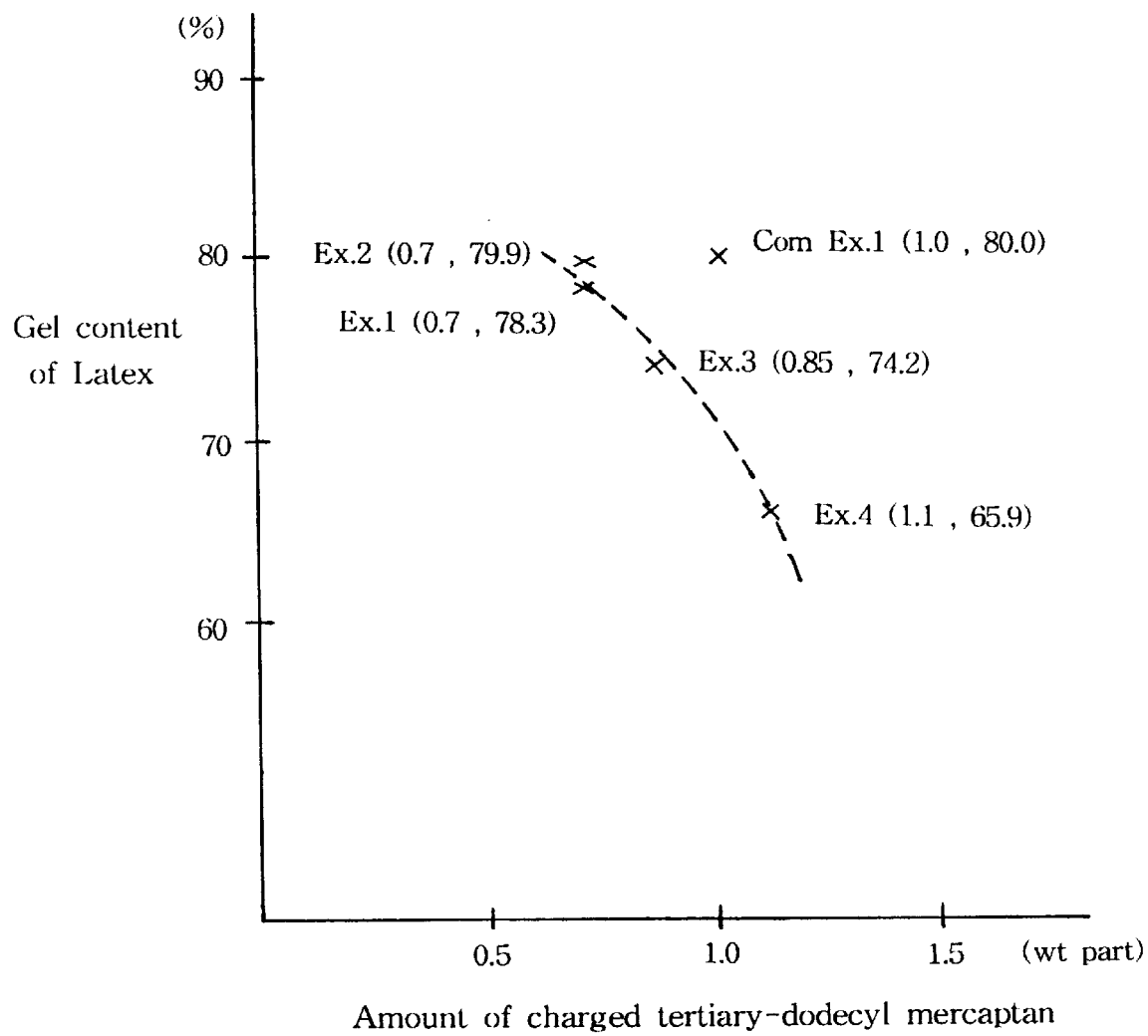
FIG. 1 shows the relationship between the amount of charged tertiary-dodecyl mercaptan in increment polymerization step and the gel content of latex.

The emulsion polymerization process for carboxylated styrene-butadiene latex of the present invention comprises two steps, which are an initial polymerization with batch charge of 10~20 wt % of the total monomers and an increment polymerization step by continuous charge of 80~90 wt % of the total monomers.

In initial polymerization step, 12.0~17.0 wt part (wt part as to 100 wt part of the total monomers) of styrene monomers, 0~3.0 wt part of butadiene monomers, 2.0~5.0 wt part of two kinds of acid monomers, preferably, itaconic acid monomers and acrylic acid monomers, 0.1~1.0 wt part of anionic emulsifier, 1.0~2.0 wt part of initiator, preferably, potassium persulfate, are batch-charged with deionized water in the reactor, and the mixture is pre-emulsified at 20~30° C. for 20~40 minutes. Then, after heating the mixture to about 60° C., 0.4~0.6 wt part of reducing agent, preferably, sodium bisulfite is charge, and the mixture is polymerized for about 1 hour.

In increment polymerization step, the product polymerized in initial polymerization step, 40.0~50.0 wt part of styrene monomers, 30.0~40.0 wt part of butadiene monomers and 0.4~1.5 wt part of tertiary-dodecyl mercaptan are continuouly charged for 8 hours and the reaction is completed during the period of about 12 hours. The polymerization temperature is increased step by step from 70° C. to 80° C. 0.1~1.5 wt part of anionic emulsifier is more charged after 4 hour's reaction at 75° C. and 0.3~0.7 wt part of acid monomers, preferably, acrylic acid monomers are charged after about 8 hours at 80° C. After charging all monomers and agents, the reaction is then allowed for 4 hour's aging. Finally, the carboxylated styrene-butadiene latex is prepared after charging and stirring 1.5~2.0 wt part of sodium hydroxide to finish the reaction.

As shown in FIG. 1, the gel content of latex has a close relationship with the amount of charged tertiary-dodecyl mercaptan in increment polymerization step. Therefore, we can obtain the latex having desired gel content by controlling the amount of charged tertiary-dodecyl mercaptan.

The polymerization method of the present invention has following merits compared to the previous conventional methods. First, the minimizing the gel content in the initial polymerization step makes the process control efficiently. Second, the sole charge of tertiary-dodecyl mercaptan in the increment step makes the kinetic control easy. Third, the monomers used in the initial polymerization step essentially consisting of styrene monomers and carboxylic acid monomers enhance the stability of polymerization and diminish the contamination of reactor.

The present invention can be explained more concretely by following examples. However, the scope of this invention shall not be limited only by following examples.

EXAMPLE 1

Initial Polymerization Step

To the reactor, following polymerization reagents were batch charged, and the mixture was stirred for 30 min at 25° C.

| butadiene | 1.0 | part |
|---|---|---|
| styrene | 15.5 | part |
| itaconic acid | 3.0 | part |
| acrylic acid | 0.5 | part |
| anionic emulsifier | 0.35 | part |
| potassium persulfate | 1.5 | part |
| deionized water | 160.0 | part |

Then, after heating the mixture to 60° C., 0.5 part of sodium bisulfite as reducing agent was charged, and the mixture was polymerized for 1 hour.

Increment Polymerization Step

Following polymerization reagents were continuously charged and reacted in the product polymerized in initial polymerization step for 8 hours.

| butadiene | 37.0 | part |
|---|---|---|
| styrene | 42.5 | part |
| tertiary-dodecyl mercaptan | 0.7 | part |

The polymerization temperature was increased step by step from 70° C. to 80° C. Aqueous solution of anionic emulsifier (0.1 part) was charged after 4 hour's reaction at 75° C., and aqueous solution of acrylic acid monomer (0.5 part) were charged after 8 hours at 80° C. After charging all monomers and reagents, the reaction was allowed for 4 hour's aging. Finally, the carboxylated styrene-butadiene latex was prepared after charging and stirring 1.7 part of sodium hydroxide to finish the reaction.

COMPARATIVE EXAMPLE 1

Initial Polymerization Step

To the reactor, following polymerization reagents were batch charged, and the mixture was stirred for 30 min at 25° C.

| butadiene | 6.0 | part |
|---|---|---|
| styrene | 15.5 | part |
| itaconic acid | 3.0 | part |
| acrylic acid | 0.5 | part |
| tertiary-dodecyl mercaptan | 0.2 | part |
| anionic emulsifier | 0.35 | part |
| potassium persulfate | 1.5 | part |
| deionized water | 160.0 | part |

Then, after heating the mixture to 55° C., 0.5 part of sodium bisulfite was charged, and the mixture was polymerized for 1 hour.

Increment Polymerization Step

Following polymerization reagents were continuously charged and reacted in the product polymerized in initial polymerization step for 8 hours.

| butadiene | 28.0 | part |
|---|---|---|
| styrene | 46.5 | part |
| tertiary-dodecyl mercaptan | 0.8 | part |

The polymerization temperature was increased step by step from 70° C. to 80° C. Aqueous solution of anionic emulsifier (0.1 part) was charged after 4 hour's reaction at 75° C., and aqueous solution of acrylic acid monomer (0.5 part) were charged after 8 hours at 80° C. After charging all monomers and reagents, the reaction was allowed for 4 hour's aging. Finally, the carboxylated styrene-butadiene latex was prepared after charging and stirring 1.7 part of sodium hydroxide to finish the reaction.

EXAMPLE 2

The latex was prepared as the same manners in example 1 except that 2.5 part of butadiene and 14.0 part of styrene were charged in initial polymerization step.

EXAMPLE 3

The latex was prepared as the same manners in example except that 0.85 part of tertiary-dodecyl mercaptene was charged in increment polymerization step.

EXAMPLE 4

The latex was prepared as the same manners in example 1 except that 1.1 part of tertiary-dodecyl mercaptan was charged in increment polymerization step.

The latexes prepared from examples and comparative example were concentrated using vacuum evaporator to 48% total solid contents. Then, the gel content of each latex was measured. Table 1 showed the gel content of each latex.

TABLE 1

| | Gel content of each latex | | | | |
|---|---|---|---|---|---|
| Latex | Com. Ex. 1 | Exam. 1 | Exam. 2 | Exam. 3 | Exam. 4 |
| Gel content(%) | 80.0 | 78.3 | 79.9 | 74.2 | 65.9 |

We claim:

1. A high temperature polymerization method for producing carboxylated styrene-butadiene latex having a gel content of from 50% to about 90%, said method comprising:

1) an initial polymerization step comprising reacting and batch-charge polymerizing styrene and optionally, butadiene monomers, with acid monomers, emulsifier, initiator and a reducing agent at a temperature of about 60° C., wherein 10~20 wt % of total styrene and butadiene monomers react to form a polymerized product; and 2) an increment polymerization step comprising reacting and continuously- charge polymerizing the polymerized product, styrene monomers and butadiene monomers with acid monomers, emulsifier and tertiary dodecyl mercaptan, and incrementally increasing the temperature from 70° C. to 75° C. to 80° C., wherein 80~90 wt % of total styrene and butadiene monomers react to form a final polymerized product.

2. The polymerization method according to claim 1, wherein 12.0~17.0 wt part of styrene monomers, 0~3.0 wt part of butadiene monomers, 2.0~5.0 wt part of two kinds of acid monomers, 0.1~1.0 wt part of anionic emulsifier, 1.0~2.0 wt part of initiator, and 0.4~0.6 wt part of reducing agent are batch-charged and reacted in initial polymerization step.

3. The polymerization method according to claim 1, where the product polymerized in initial polymerization step, 40.0~50.0 wt part of styrene monomers, 30.0~40.0 wt part of butadiene monomers, 0.4~1.5 wt part of tertiary-dodecyl mercaptan, 0.1~1.5 wt part of anionic emulsifier and 0.3~0.7 wt part of acid monomers are continuously charged and reacted in increment polymerization step.

4. The polymerization method according to claim 3, where the carboxylated styrene-butadiene latex is prepared after charging 1.5~2.0 wt part of sodium hydroxide and stirring to finish the reaction.

* * * * *